(12) United States Patent
Kinast et al.

(10) Patent No.: US 6,272,762 B1
(45) Date of Patent: Aug. 14, 2001

(54) OVALITY MEASUREMENT METHOD AND APPARATUS

(75) Inventors: John Arthur Kinast, Chicago; William Fredrick Rush, Tinley Park; Victor Tamosaitis, Mokena, all of IL (US)

(73) Assignee: Gas Research Institute, Chicago, IL (US)

( * ) Notice: Subject to any disclaimer, the term of this patent is extended or adjusted under 35 U.S.C. 154(b) by 0 days.

(21) Appl. No.: 09/397,306

(22) Filed: Sep. 15, 1999

(51) Int. Cl.[7] .................................. G01B 5/20; G01B 7/28
(52) U.S. Cl. .................................. 33/550; 33/504; 33/555
(58) Field of Search ......................... 33/550, 188, 504, 33/505, 529, 549, 555, 555.1, 555.3

(56) References Cited

U.S. PATENT DOCUMENTS

| | | |
|---|---|---|
| 2,855,687 | * 10/1958 | Price ..................................... 33/555.3 |
| 3,751,812 | 8/1973 | Meyer . |
| 3,921,300 | 11/1975 | Cox et al. . |
| 4,132,001 | * 1/1979 | Patrick ............................... 33/501.45 |
| 4,231,158 | 11/1980 | Possati . |
| 4,240,206 | 12/1980 | Baresh et al. . |
| 4,543,725 | 10/1985 | Golinelli et al. . |
| 4,614,038 | 9/1986 | Fivaz et al. . |
| 4,700,484 | 10/1987 | Frank et al. . |
| 4,977,682 | * 12/1990 | Allen, III ............................... 33/550 |
| 5,337,485 | * 8/1994 | Chien ..................................... 33/550 |
| 5,345,309 | 9/1994 | Wertz et al. . |

* cited by examiner

Primary Examiner—Christopher W. Fulton
(74) Attorney, Agent, or Firm—Pauley Petersen Kinne & Fejer

(57) ABSTRACT

An ovality measurement tool for measurement of ovality of a circumferentially deformable cylindrical element having a cylindrical element support, a sensing element for traversing the circumference of the cylindrical element, which sensing element is movable radially with respect to the cylindrical element, and a readout device for reading the amount of movement of the sensing element as it traverses the circumference of the cylindrical element.

16 Claims, 4 Drawing Sheets

OVALITY MEASUREMENT METHOD AND APPARATUS

BACKGROUND OF THE INVENTION

1. Field of the Invention

This invention relates to a method and apparatus for measuring the irregularities in the shape of a circumferentially deformable cylindrical element, such as a large diameter plastic pipe. More particularly, this invention relates to a method and apparatus for measuring the ovality of plastic pipe. In addition, this invention relates to a method and apparatus for determining the scratch depth of a scratch on the outer surface of the plastic pipe.

2. Description of Prior Art

When large diameter plastic pipe is wound into a coil, the circular cross-section of the pipe is distorted into a roughly elliptical shape. When large diameter coiled pipe is then unwound for installation, for example in connection with utility operations such as natural gas transmission and distribution, a re-rounding mechanism is used to restore the circular cross-section of the plastic pipe. Due to the viscoelastic properties of the plastic pipe, the re-rounding mechanism distorts the elliptical cross-section of the pipe into an elliptical cross-section that is perpendicular to the major axis of the original elliptical cross-section. It is, thus, apparent that the ability to determine the longest (major) axis of an out-of-round pipe is an important aspect of correcting the out-of-roundness. After re-rounding, the pipe creeps into a nearly circular shape. To achieve a circular cross-section after re-rounding, the re-rounding mechanism must be adjusted to account for the size, cross-sectional shape and composition of the pipe, temperature of the pipe, and rate of travel of the pipe through the re-rounding mechanism. In current practice, a hand micrometer or caliper is used to measure the major and minor diameter of the pipe as it leaves the re-rounding mechanism and before the pipe reaches the ground behind a coiled pipe trailer.

Measuring ovality of the pipe is particularly critical for joining ends of the pipe together. For example, in preparing polyethylene pipe sections for joining, it is critical that the cross sectional profile of the ends are congruent in order for a proper fusion joint to occur. In addition, for the proper application of saddles, tees and other fittings, the circumferential shape of the pipe must be such that the pipe wall is in large part coincident with the mating surface of the applied device, again in order to insure a proper fusion joint between the two components.

In addition to ovality, measuring scratch depth is critical for determining the suitability of a section of plastic pipe. Manufacturers' guidelines frequently specify a maximum acceptable depth of a scratch as 10% of the nominal wall thickness; deeper scratches usually require the removal of the involved section due to the potential weakening of the pipe from the scratch.

There exists several known mechanisms in the prior art for profiling and measuring the surfaces of cylindrical objects, some of which are used in conjunction with manufacturing processes for controlling the roundness of the objects produced. For example, U.S. Pat. No. 5,345,309 to Wertz et al. teaches a system for generating a solid model of the sidewall of a container in which a mandrel selectively holds the container being evaluated in two locations. In the first location, a non-contact measurement apparatus utilizing a digital camera produces digital information for generating a three-dimensional sidewall surface profile of the container based upon shadow edge detection. In the second position, a contact measurement apparatus produces information for generating a three-dimensional sidewall thickness map of the container. The computer collects the information from the measurement apparatuses and produces an overall solid model of the sidewall of the container based upon sidewall surface profile and sidewall thickness. The computer generates object tilts, diameter, ovality, and squarity information. The information thus collected is then used to control the manufacture of additional cylindrical objects. The contact measurement apparatus includes a plurality of LVDTs (linear variable differential transformers), each of which interacts with a mechanical contact apparatus to mechanically contact various locations on the sidewall of the object to provide sidewall thickness measurements at a plurality of circumferential locations on the object. The contact apparatuses are mechanically in contact with the linear variable differential transformers which, in turn, are electrically connected to a linear variable differential transformer interface which then delivers the contact measurements to a multiplexer. The multiplexer interconnects with an analog to digital converter which, in turn, delivers digital data to a computer. Each contact apparatus along the sidewall of the object adjusts to a desired elevation under control of a stepper motor, becomes activated to perform measurements under control of an actuator, and engages its own linear variable differential transformer to deliver the measurements.

U.S. Pat. No. 4,700,484 to Frank et al. teaches an apparatus for measuring the diameter of an object in which a rotatable wheel of known diameter capable of movement in three axes is contacted with an object capable of rotation. The wheel is attached to a shaft encoder which produces pulses as the wheel rotates. As the object is rotated, start and end reference marks are sent and the pulses produced by the shaft encoder are counted. A microprocessor calculates the diameter of the object based upon the wheel diameter, counts per revolution of the wheel, and the counts per revolution of the object.

U.S. Pat. No. 4,240,206 to Baresh et al. teaches an ovality measuring device and method for measuring the ovality of tubing comprising an anvil having an electromechanical probe which measures across a tube while a second anvil and electromechanical probe measure across the tube at right angles to the first anvil and probe. Signals from each of the probes are summed and displayed to show the ovality of the tubing. The anvils and probes are mounted to a head that is rotated open to permit placement over tubing and resiliently rotated closed to bring the probes in contact with the tubing.

One of the requirements of known apparatuses for measuring the ovality of cylindrical objects is access to the entire cylindrical object circumference. However, there are many instances in the utility industry, in particular, in the case of partially buried pipelines, where access to the entire circumference of the pipe at a given location along the length of the pipe is not available. Thus, there is a need for a method and apparatus for determining the ovality of a cylindrical object which does not require access to the entire circumference of the cylindrical object in order to make an accurate determination of the ovality of the cylindrical object.

SUMMARY OF THE INVENTION

Accordingly, it is one object of this invention to provide a method for measuring the ovality of a circumferentially deformable cylindrical object which can be carried out using less than the total circumference of the cylindrical object.

It is another object of this invention to provide an apparatus for measuring the ovality of a circumferentially deformable cylindrical object which is suitable for in-the-field applications, such as partially buried pipe.

It is yet another object of this invention to provide an apparatus for measurement of the ovality of a circumferentially deformable cylindrical object which can provide an ovality determination based upon less than the total circumference of the cylindrical object.

These and other objects of this invention are addressed by a method for measuring ovality of a circumferentially deformable cylindrical element in accordance with one embodiment of this invention comprising the steps of positioning the cylindrical element in an ovality measurement tool comprising a cylindrical element support having at least two contact elements, each of which has a contact point end, whereby the distance between said contact point ends is less than 2×square root of $(r^2/2)$ where "r" is the radius of the circumferentially deformable cylindrical element prior to deformation, and an indicator means having a sensing element having a sensing element end which is movable radially with respect to the cylindrical element and connected to the cylindrical element support. The sensing element bisects an angle formed by the contact point ends and a point of connection of the sensing element to the cylindrical element support, whereby the cylindrical element simultaneously contacts the contact point ends and the sensing element end. Upon positioning of the cylindrical element in the ovality measurement tool, the sensing element end of the sensing element is rotated through at least 180° of the circumference of the cylindrical element during which the radial displacement of the sensing element is measured. Knowing the radial displacement of the sensing element end of the element during the traversal of 180° of the circumference of the cylindrical element and having prior knowledge of the circumference of the cylindrical element enables one skilled in the art to determine the ovality or degree of roundness (or out-of-roundness) of the cylindrical element. In accordance with a particularly preferred embodiment of this invention, the maximum radial distance traversed by the sensing element end of the sensing element (total indicated reading) is determined and converted to a percent ovality reading from a table.

An ovality measurement tool for measurement of ovality of a circumferentially deformable cylindrical element in accordance with one embodiment of this invention comprises a cylindrical element support comprising at least two contact elements, each of which comprises a cylindrical element contact point end, the distance between said contact point ends being less than the diameter of the circumferentially deformable cylindrical element. A sensing element having a sensing element end is movably connected to the contact element and bisects an angle formed by the cylindrical element contact point ends and the connection point of the sensing element to the contact element whereby the sensing element is movable in a longitudinal direction. Readout means for reading the amount of movement of the sensing element end of the element are operatively connected to the sensing element.

BRIEF DESCRIPTION OF THE DRAWINGS

These and other objects and features of this invention will be better understood from the following detailed description taken in conjunction with the drawings wherein.

DESCRIPTION OF PREFERRED EMBODIMENTS

This invention comprises two components or modules, each having one function. The first is a measuring component or module, that is, a device suitable for determining the variation of the diameter of the pipe. The second is a computational component or module, suitable for monitoring the readings of the measuring module and implementing an algorithm to determine the ovality of the cylinder (in the first role) and the scratch depth (in the second role). In addition, the computational component is capable of displaying information for reporting the results of the testing. The modules may be two physically separate objects or combined into one physically integrated object.

In order to be effective for determining the ovality or degree of roundness of a cylindrical element such as a utility pipeline where access to the entire circumference of the cylindrical element is unavailable, as is frequently the case with "in-the-field" measurements, an ovality measurement tool must enable the user to determine ovality based upon measurements of less than the entire circumference of the cylindrical element. The ovality measurement tool of this invention enables a determination of ovality to be made on the basis of as little as 180° of the circumference of the cylindrical element. As a result, the ovality measurement tool of this invention is particularly suitable for use in field applications. In addition, we have found that there is a good correlation between the results obtained with the ovality measurement tool of this invention compared to the micrometer/caliper methodology and equipment commonly used in measuring pipe ovality. Previous ovality measurement methods have relied upon either having access to the entire circumferential path of the cylindrical object or rotating the cylindrical object past a sensor at a fixed location. The method and apparatus of this invention require movement of a sensor over only a portion of the surface of a static cylindrical object.

Figure 1:
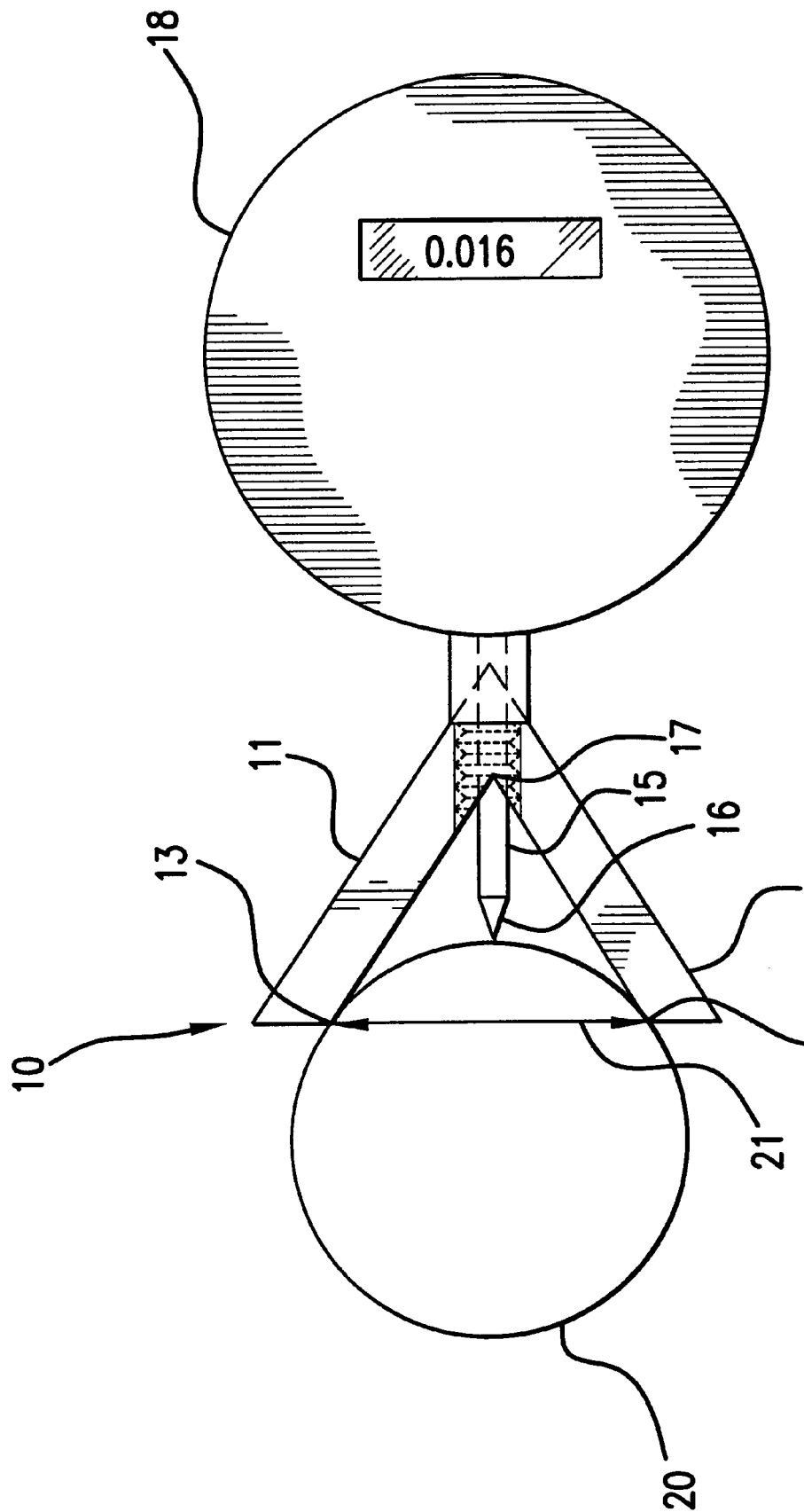
FIG. 1 is a schematic diagram of a plan view of an ovality measurement tool for measurement of ovality of a circumferentially deformable cylindrical element in accordance with one embodiment of this invention.

FIG. 1 is a diagram of an ovality measurement tool suitable for use in the method of this invention. In accordance with the method of this invention, a cylindrical element 20 is positioned within an ovality measurement tool comprising cylindrical element support 10 having at least two contact elements 11, 12, each of which has a contact point end 13, 14 in contact with cylindrical element 20 (hereinafter referred to as contact point). A sensing element 15 having a sensing element end 16 at one end and indicator means 18 at the opposite end is movably connected to cylindrical element support 10 whereby sensing element end 16 is movable radially with respect to cylindrical element 20. Sensing element 15 bisects an angle formed by contact points 13, 14 and a point of connection 17 of sensing element 15 to cylindrical element support 10. When positioned in the ovality measurement tool of this invention, cylindrical element 20 simultaneously contacts contact points 13, 14 and sensing element end 16 of element 15.

Upon positioning of cylindrical element 20 in cylindrical element support 11, the ovality measurement tool is rotated around a portion of the circumference of cylindrical element 20 such that sensing element end 16 traverses at least 180° of the circumference of cylindrical element 20. During the course of the traversal of the circumference of cylindrical element 20 by sensing element end 16, the radial displacement of sensing element end 16 is measured. Based upon the radial displacement of sensing element end 16 during traversal of the circumference of cylindrical element 20, one can determine by any number of means the degree of out-of-roundness, if any, of cylindrical element 20. In accordance with one embodiment of the method of this invention particularly suitable for in-the-field applications, a total indicated reading corresponding to the maximum radial distance traversed by the sensing element end 16 is determined and converted to a percent ovality reading by reference to a conversion table.

As shown in FIG. 1, cylindrical element support 10 is a V-shaped element with each leg thereof corresponding to a contact element 11, 12 and with element 15 connected to, and extending through the base point of the V-shaped element.

It will, however, be apparent to those skilled in the art that other configurations of the cylindrical element support are feasible. In accordance with the embodiment shown in FIG. 2, cylindrical element support 30 is a V-block 35 which forms a V-shaped channel 36 having contact elements 31, 32 and contact points 33, 34. As in the embodiment shown in FIG. 1, sensing element 15 extends through V-block 35 and into V-shaped channel 36 at the base point of V-shaped channel 36. Sensing element 15 is movably connected to V-block 35 such that sensing element end 16 is movable radially with respect to cylindrical element 20.

Figure 2:
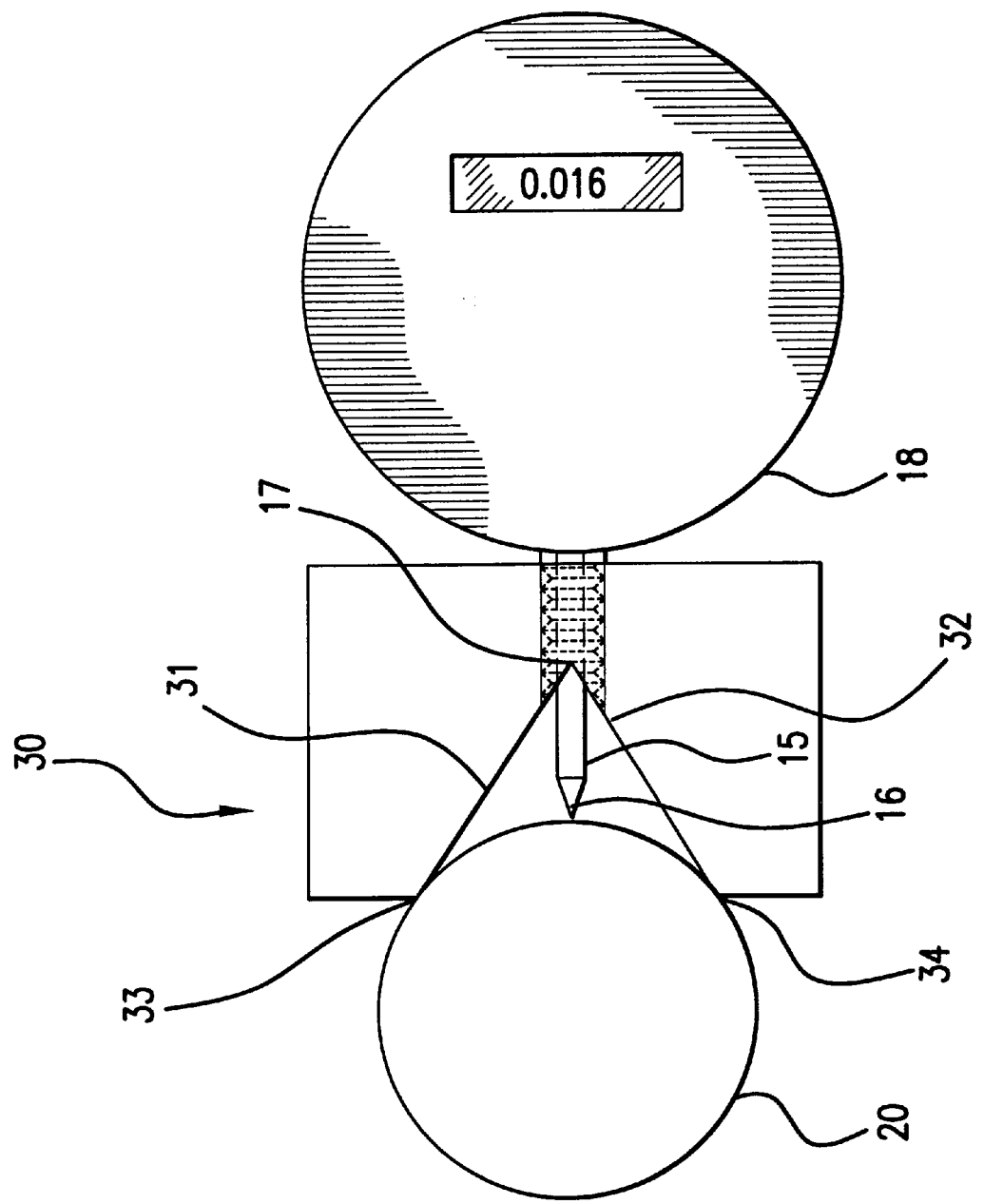
FIG. 2 is a schematic diagram of an ovality measurement tool for measurement of ovality of the circumferentially deformable cylindrical element in accordance with another embodiment of this invention.

Although a V-shaped cylindrical element support as shown in FIGS. 1 and 2 is particularly suitable, any cylindrical element support which provides a relationship between cylindrical element 20, contact points 13, 14, 33, 34, and sensing element connection point 17, whereby sensing element end 16 is movable radially with respect to cylindrical element 20, is suitable for use in the measurement of ovality in accordance with the method of this invention.

Figure 3:
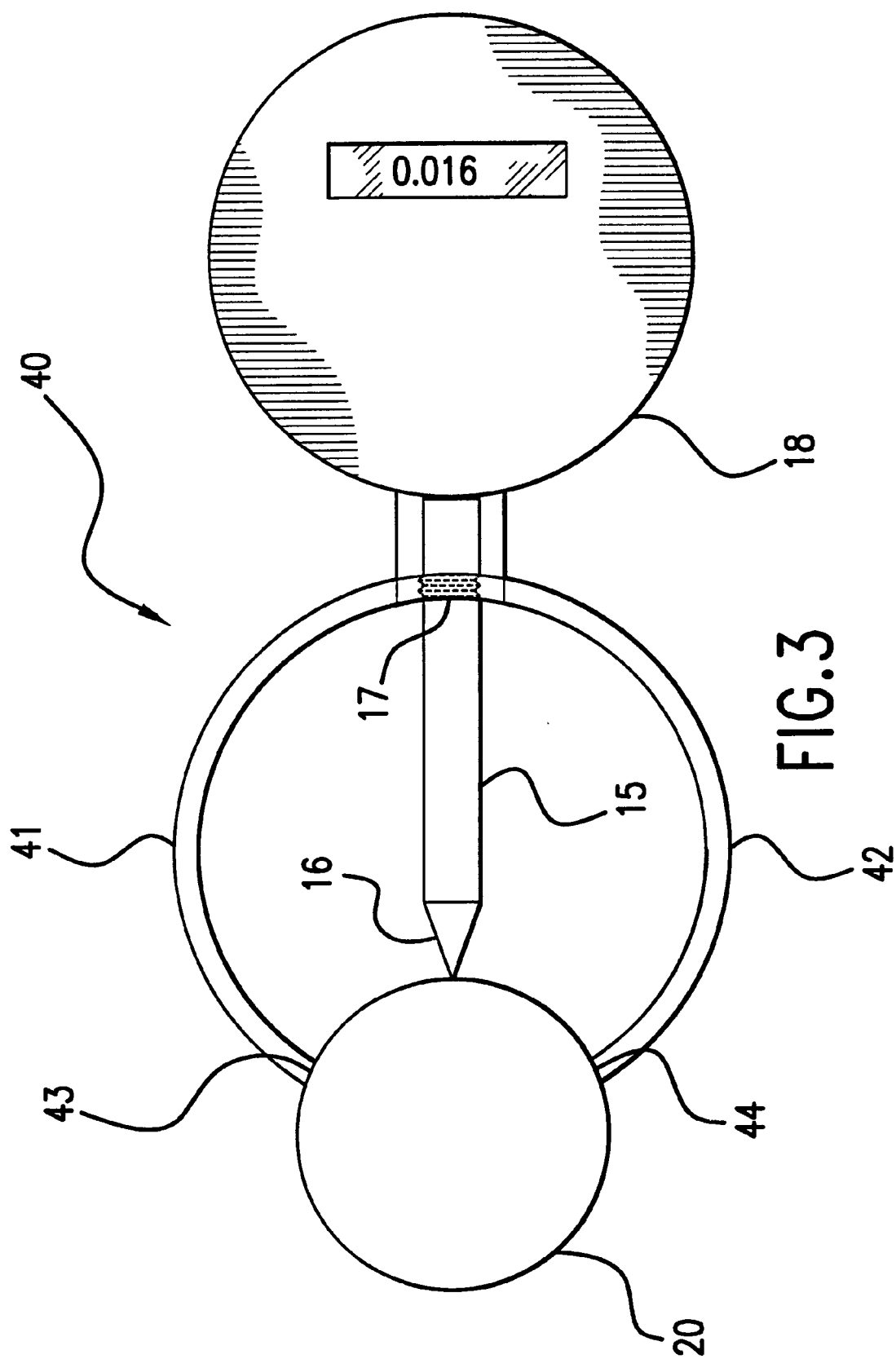
FIG. 3 is a schematic diagram of a plan view of an ovality measurement tool for measurement of ovality of a circumferentially deformable cylindrical element in accordance with another embodiment of this invention.

An alternative embodiment of an ovality measurement tool in accordance with this invention is shown in FIG. 3. In the embodiment shown in FIG. 3, cylindrical element support 40 is a curved element, as opposed to a V-shaped element, comprising contact elements 41, 42 having contact points 43, 44. As shown, sensing element 15 bisects an angle formed by contact points 43, 44 and sensing element connection point 17.

In accordance with one embodiment of this invention, the readout means comprises an ovality means in the form of a small computer integral with the readout means for derivation of ovality based upon the distance traversed by sensing element end 16 of sensing element 15. The use of a small computer facilitates recording the results of the measurements and ovality calculation, documenting them with time stamps, and transferring them to company computers with no risk of copying errors going from hand-written records to an electronic system.

Figure 4:
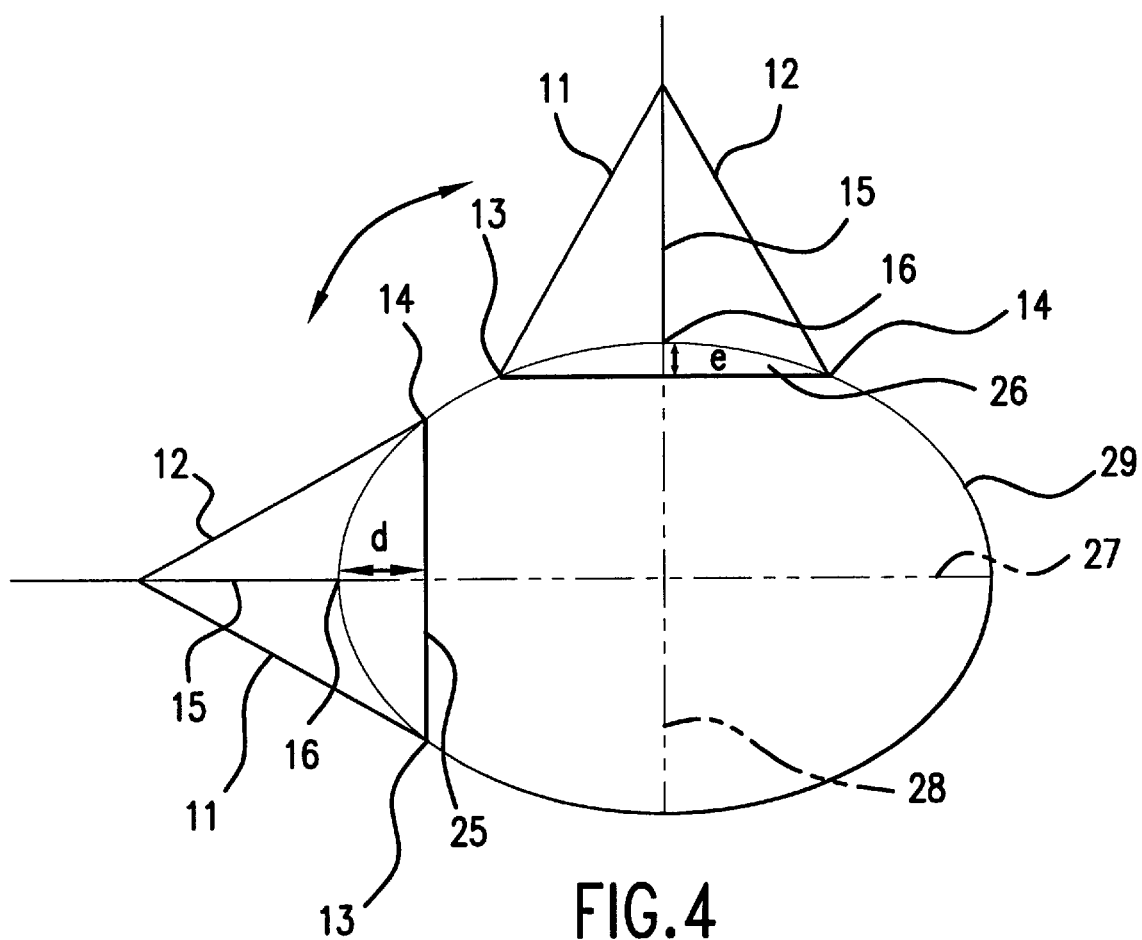
FIG. 4 is a schematic diagram showing application of an ovality measurement tool in accordance with one embodiment of this invention to an out-of-round pipe in the shape of an ellipse.

We have found that converting the data involving the maximum and minimum excursion of the indicator dial into ovality is not a simple matter. This is because the indicator dial output number has no intuitively obvious relationship to the relevant parameter of the problem. In particular, experience shows that while the relevant parameter is the difference between the largest and smallest diameter, this is not the difference between the largest and smallest reading on the measurement device. In order to be functional, it is critical that the distance 21 across the top of the vee is smaller than 2×square root of $(r^2/2)$ where "r" is the radius of the circumferentially deformable cylindrical element prior to deformation, for example, approximately 3 inches for pipes in the range of nominal 4 to 8 inch diameters. If the top-of the vee distance is less than 2 inches for applications to pipes with diameters in the range of about 4 to 8 inches, the variation in the maximum to minimum readings on the gauge will be so small that they are not accurate enough to determine the ovality of the pipe to the required precision. If the open end of the vee is more than about 3 inches, a 4-inch pipe will slide inside of the vee. Oval pipe will then contact the sides of the vee, rather than the insides of the tips of the vee. As shown in FIG. 4, this means that the chord 25, 26 of the pipe cross section defined by the two points of contact 13, 14 of the vee block and the pipe wall will change in length. This invention relies on the pipe contacting the vee at the inside edges, so that the chord is of known length. An error of 0.03 inches in this chord length can change the indicated ovality from a calculated value of 5% to a calculated value of 6%. Since 5% is the maximum allowable ovality for pipe to be installed, sliding the pipe into the interior of the vee block could cause a crew to discard pipe that was actually suitable for use.

Once it is assured that the contact point between the pipe and the tips of the vee block is in fact the chord of known length, the issue becomes how to compute the ovality of this pipe on a small computer with little memory and also how to convert the maximum and minimum readings to ovality. This can be done by using the equation of an ellipse (found from experience to be a close approximation to the shape of oval pipe in the field). One skilled in the art can begin a calculation on a spread sheet with a circle of diameter equal to the nominal diameter of the pipe to whose ovality is to be determined. Then the circle is conceptually converted to an ellipse 29, as shown in FIG. 4, by increasing one diameter 27 (major axis) of the circle/ellipse by a small amount (say, 0.01 inches) and decreasing the other diameter 28 (minor axis). The amount of decrease in the second diameter will be such that it keeps the circumference of the new ellipse constantly equal to the diameter of the original circle. Experience indicates that this is a good approximation to what occurs in the field. Given the assumptions of a fixed circumference and an assumed large diameter, as well as knowing the equation of the circumference of an ellipse in standard form, the minor axis of the ellipse can be calculated. Subtracting the length of the minor axis of the ellipse from the length of the major axis gives the difference in axes, which is then divided by the average of the diameters to produce the defined ovality. This result, which will be called the ovality for a given major axis, is retained for future use.

Next, using elementary trigonometry and the known length of the chord (defined by the opening of the vee block), one skilled in the art can calculate the point on the ellipse 29 at which the chord 25, 26 intersects the sides of the ellipse when the chord 25, 26 is bisected perpendicularly by the major and minor axes. Again, using elementary trigonometry, one skilled in the art can calculate the distances d, e between the center of the chord 25, 26 and the ellipse 29 at both the major and minor axes. These two differences are then subtracted from one another and the resulting difference is recorded for future use and called the difference for a given major axis. The final step is to repeat these steps for a range of major axes until the ovality calculations span a range of interest in the field, typically to 15% or more.

Then a database is prepared, recording the corresponding difference values for a given major axis and the ovality for (the same) given major axis. This database is stored in the computer, which typically is so small that it does not have enough memory to do the above complex calculations. The small computer is programmed to record the largest and smallest values measured by the electronic dial indicator, compute the difference after the measurement is made, and determine the ovality for the calculated difference. The maximum and minimum readings are also retained. The dial indicator reading is displayed continuously on the same screen as the maximum and minimum values. This allows the user to rotate the vee block around the side of the pipe until the reading on the indicator agrees with the previously recorded maximum or minimum. When this condition is obtained, the user knows that the vee block has been positioned at the maximum or minimum axis of the ellipse. The small computer may also be programmed to display a symbol or word and/or sound an audible indicator when the maximum or minimum axis position is located.

As previously stated, field experience has shown that it is important to be able to determine the longest axis of a non-round pipe since compression of the pipe along the long axis is used for correcting out-of-roundness. In addition to being able to accurately determine the longest axis, the device of this invention can be used for a second, closely related field operation: the determination of scratch depth. Most manufacturers recommend that pipe not be installed if there are scratches in the wall that exceed 10% of the thickness of the wall. This requires measuring the depth of the scratch, knowing the thickness of the pipe wall, and computing the ratio of scratch depth to wall diameter. Measurement of scratch depth using the apparatus of this invention is accomplished by longitudinally traversing a pipe having a scratch from a point on the pipe having no scratch to the location of the scratch for which the scratch depth is being determined. While this is simple in principle, this invention makes this field procedure more convenient, faster, and less costly by storing in the computer the wall thickness of common field pipes, electronically recording the dial indicator reading on a good section of the pipe and on the scratched section. The computer takes the difference, divides by wall thickness, and converts the result to a percentage in under a second with no need for human writing and computation. Again, results can be documented and stored in an electronic database.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. A method for measuring ovality of a circumferentially deformable cylindrical element comprising the steps of:

positioning said deformable cylindrical element in an ovality measurement tool comprising a cylindrical element support having at least two contact elements, each said contact element having a cylindrical contact point end, and an indicator means having one sensing element, said sensing element having a sensing element end movable radially with respect to said deformable cylindrical element and connected to said cylindrical element support and bisecting an angle formed by said contact point ends and a point of connection of said sensing element to said cylindrical element support, whereby said deformable cylindrical element simultaneously contacts said contact point ends and said sensing element end;

traversing at least 180° of the circumference of said deformable cylindrical element with said sensing element end;

measuring a radial displacement of said sensing element end during said traversal of said circumference of said deformable cylindrical element; and converting said radial displacement measurement to a percent ovality reading.

2. A method in accordance with claim 1 further comprising determining the major and minor axes of the circumferentially deformable cylindrical element.

3. A method in accordance with claim 1 further comprising generation and storage of a database comprising a maximum radial distance traversed by said sensing element end for a given major axis of the circumferentially deformable cylindrical element and an ovality corresponding to said major axis, whereby the maximum radial distance traversed directly corresponds to said ovality.

4. A method in accordance with claim 3, wherein said maximum radial distance traversed by said sensing element end is established by determining a difference between a distance between the circumference of said circumferentially deformable cylindrical element and a center of a chord defined by said contact point ends and said circumferentially deformable cylindrical element for a major axis and a minor axis of said circumferentially deformable cylindrical element.

5. A method in accordance with claim 1, wherein said cylindrical element support is a V-shaped element.

6. A method in accordance with claim 5, wherein said sensing element extends through a base point of said V-shaped element.

7. A method in accordance with claim 1, wherein said cylindrical element support is a V-block having a V-shaped channel.

8. A method in accordance with claim 7, wherein said sensing element extends through a bottom of said V-block and a base point of said V-shaped channel into said V-shaped channel.

9. A method in accordance with claim 1 further comprising longitudinally traversing said circumferentially deformable cylindrical element and measuring said radial displacement of said sensing element end during said traversal between a smooth portion of a surface of said circumferentially deformable cylindrical element and a scratch disposed in said surface.

10. A method in accordance with claim 1, wherein a distance between said contact point ends is less than 2×square root of $(r^2/2)$ where "r" is the radius of the circumferentially deformable cylindrical element prior to deformation.

11. An apparatus comprising:

a cylindrical element support comprising at least two contact elements, each said contact element comprising at least one cylindrical element contact point end;

one sensing element having a sensing element end, said sensing element movably connected to said contact element and bisecting an angle formed by said cylindrical element contact point ends and a connection point of said sensing element to said contact element, said sensing element movable in a longitudinal direction;

indicator means for reading an amount of movement of said sensing element end operatively connected to said sensing element; and ovality means for converting said movement of said sensing element end to an ovality of said circumferentially deformable cylindrical element.

12. An apparatus in accordance with claim 11, wherein said cylindrical element support is V-shaped and said sensing element is connected to said to said V-shaped cylindrical element support as a base point thereof.

13. An apparatus in accordance with claim 11, wherein said cylindrical element support is a block having a V-shaped channel and said element extends through a bottom of said block, a base point of said V-shaped channel and into said V-shaped channel.

14. An apparatus in accordance with claim 11 further comprising database means for generating a database comprising a maximum radial distance traversed by said sensing element end for a given major axis of the circumferentially deformable cylindrical element and an ovality corresponding to said major axis, whereby the maximum radial distance traversed directly corresponds to said ovality.

15. An apparatus in accordance with claim 11, wherein said ovality means comprises a computer.

16. An apparatus in accordance with claim 11, wherein a distance between said contact point ends is less than $2 \times$ square root of $(r^2/2)$ where "r" is the radius of the circumferentially deformable cylindrical element prior to deformation.

* * * * *